(12) United States Patent
Guatteri

(10) Patent No.: US 7,392,139 B2
(45) Date of Patent: Jun. 24, 2008

(54) SYSTEM AND METHOD FOR PROVIDING EARTHQUAKE DATA

(75) Inventor: Maria Giovanna Guatteri, New York, NY (US)

(73) Assignee: Swiss Reinsurance Company, Zurich (CH)

( * ) Notice: Subject to any disclaimer, the term of this patent is extended or adjusted under 35 U.S.C. 154(b) by 7 days.

(21) Appl. No.: 11/389,228

(22) Filed: Mar. 27, 2006

(65) Prior Publication Data

US 2007/0225917 A1 Sep. 27, 2007

(51) Int. Cl.
  *G06F 19/00* (2006.01)
  *G08B 21/00* (2006.01)
(52) U.S. Cl. .......................................... 702/15; 340/690
(58) Field of Classification Search ................... 702/15, 702/14; 340/690; 706/929; 367/73; 703/5; 73/784
  See application file for complete search history.

(56) References Cited

U.S. PATENT DOCUMENTS

| | | | | |
|---|---|---|---|---|
| 5,373,486 A | * | 12/1994 | Dowla et al. ................. | 367/135 |
| 5,490,062 A | * | 2/1996 | Leach et al. .................. | 702/15 |
| 5,842,148 A | | 11/1998 | Prendergast et al. .......... | 702/34 |
| 6,629,106 B1 | * | 9/2003 | Narayanaswamy et al. ......................... | 707/104.1 |
| 6,885,945 B2 | * | 4/2005 | Fujinawa et al. .............. | 702/15 |
| 2006/0218021 A1 | * | 9/2006 | Sato .............................. | 705/4 |

FOREIGN PATENT DOCUMENTS

| | | |
|---|---|---|
| JP | 9-54767 | 2/1997 |
| JP | 09054767 A * | 2/1997 |
| JP | 2002-267763 | 9/2002 |
| JP | 2002267763 A * | 9/2002 |
| JP | 2003-141670 | 5/2003 |
| JP | 2003141670 A * | 5/2003 |

(Continued)

OTHER PUBLICATIONS

Dargahi-Noubary, G. R., The Use of Modern Statistical Theories in the Assessment of Earthquake Hazard, With Application to Quiet Regions of Eastern North America, 2002, Soil Dynamics and Earthquake Engineering 22, pp. 361-369.*

(Continued)

*Primary Examiner*—John E Barlow, Jr.
*Assistant Examiner*—Toan M Le
(74) *Attorney, Agent, or Firm*—Oblon, Spivak, McClelland, Maier & Neustadt, P.C.

(57) ABSTRACT

For providing earthquake data for a defined area, stored are locations of a plurality of earthquake epicenters and seismic parameters associated with a plurality of seismic zones. The seismic parameters are indicative at least of magnitude and likelihood of earthquakes in each of the seismic zones. A location of a selected epicenter, within the defined area, is determined (S31) from the stored locations. Determined from the seismic parameters is a selected magnitude (S34) associated with a selected seismic zone comprising the selected epicenter. Established are characteristics of a plurality of earthquake events (S3) in the area over a defined length of time. The characteristics of an earthquake event include at least a selected epicenter and a selected magnitude. Generated is a signal indicative of the characteristics of the earthquake events. Enabled is an easy to maintain earthquake hazard model, having flexible and simple parameterization, and providing earthquake data consistent with historical data.

34 Claims, 7 Drawing Sheets

FOREIGN PATENT DOCUMENTS

JP 2003-307571 10/2003
JP 2003307571 A * 10/2003

OTHER PUBLICATIONS

Mandiak et al., Development of an Integrated GUI Framework for Post-Disaster Data Fusion Visualization, 2005, 7th International Conference on Information Fusion (FUSION), pp. 1131-1137.*

Liu et al., The Study on Zonal Uncertainty of the Earthquake Epicenters Obtained from Rapid Determination of Earthquake Location in Main Land China, 2005 IEEE, pp. 5268-5270.*

* cited by examiner

SYSTEM AND METHOD FOR PROVIDING EARTHQUAKE DATA

FIELD OF THE INVENTION

The present invention relates to a system and a method for providing earthquake data. Specifically, the present invention relates to a computer system and a computer-implemented method for providing earthquake data for a defined area.

BACKGROUND OF THE INVENTION

Despite many advances in seismology and although many attempts have been made by seismologists and others to create systems for earthquake predictions, many experts do not believe that a system for predicting effectively and precisely individual earthquakes would be possible. However, more general forecasts, estimating the likelihood of an earthquake of a particular magnitude affecting a particular location within a particular time span, are used to establish seismic hazard. Furthermore, for various purposes, it is desirable to determine how specific geographical areas will be affected by earthquakes over a defined length of time. This determination of long term earthquake data is particularly useful for controlling earthquake simulators, e.g. earthquake simulators that are fully computer-implemented, showing representations of earthquake events on a display, or earthquake simulators that comprise motion drivers that move mechanically parts of a model of a geographic area. Moreover, the determination of long term earthquake data is useful for generating stochastic earthquake event sets for application in loss estimation tools, used, for example, in the insurance and reinsurance industry, or for structuring pure parametric catastrophe bond deals.

SUMMARY OF THE INVENTION

It is an object of this invention to provide a computer system and a computer-implemented method for providing earthquake data for a defined geographical area and for seismic activity over a defined length of time. In particular, it is an object of the present invention to provide a computer system and a computer-implemented method for providing earthquake data wherein, on one hand, the earthquake data is consistent with historical data, and wherein, on the other hand, the earthquake data is not biased by the historical data to such an extent that randomness is no longer accounted for. It is a further object of the present invention to provide a computer system and a computer-implemented method for providing earthquake data wherein a potentially high number of earthquake events occurring in the defined length of time is reflected and handled accurately, while computer limitations and computational constraints are met (e.g. limitations on memory, processing speed and time).

According to the present invention, these objects are achieved particularly through the features of the independent claims. In addition, further advantageous embodiments follow from the dependent claims and the description.

According to the present invention, the above-mentioned objects are particularly achieved in that, for providing earthquake data for a defined area, stored in a first data store are locations of a plurality of earthquake epicenters; stored in a second data store are seismic parameters associated with a plurality of seismic zones, the seismic parameters being indicative at least of magnitude and likelihood of earthquakes in each of the seismic zones; determined from the first data store is a location of a selected epicenter within the area, e.g. by using bootstrap sampling; determined from the second data store is a selected magnitude associated with a selected seismic zone comprising the selected epicenter; established are characteristics of a plurality of earthquake events in the area over a defined length of time, the characteristics of an earthquake event including at least a selected epicenter and a selected magnitude; and generated is a signal indicative of the characteristics of the earthquake events. Defining earthquake events by determining their epicenters from a data store with historic epicenters and by determining their magnitudes from a data store with seismic parameters make possible an easy to maintain earthquake hazard model with flexible and simple parameterization. This earthquake hazard model provides earthquake data consistent with historical data and relies on complete and stable magnitude sampling. An earthquake catalog that includes instrumental and/or historical data is used as the basis for the locations of earthquake epicenters. The generated (simulated) earthquake events have the same magnitude-frequency distribution as the earthquake catalog. Moreover, characteristic earthquakes are also included in the modeling. The seismicity in the historic catalog is reflected in a stochastic event set comprising a plurality of earthquake events. Seismic zones that showed a high seismicity in the past will also show high seismicity in the future. Because the relative concentration of epicenters in different areas is reflected automatically in the stochastic event set, the "a" value of the Gutenberg-Richter distribution does not need to be pre-computed. Thus the generation of the earthquake events is simplified without decreasing their (statistical) quality.

In an embodiment, the total number of different earthquake events to be determined is determined based on the length of time to be covered by the earthquake data and on the average number of earthquake events in the area in a recording period.

Preferably, the magnitude of earthquakes in the area is split into at least two ranges of higher and lower magnitudes, and the number of earthquake events to be determined is limited for ranges with lower magnitudes, while the frequency of these latter earthquake events is adjusted correspondingly. In other words, earthquakes of lower magnitudes are down sampled, and, to preserve the total magnitude-frequency distribution, the respective event frequencies are multiplied by the factor of down sampling. Thereby, a potentially high number of earthquake events occurring in the defined length of time is reflected and handled accurately, while computer limitations, e.g. memory space, and computational constraints, e.g. processing speed and time, are met.

Preferably, the seismic parameters define a Gutenberg-Richter distribution, and the selected magnitude is determined through random sampling, e.g. using stratified sampling, from the Gutenberg-Richter distribution defined by the seismic parameters associated with selected seismic zone. For example, the seismic parameters include cumulative numbers of earthquakes of given magnitudes per year in the seismic zones and/or return periods of earthquakes of specific magnitudes in the seismic zones.

Preferably, a selected location is determined by applying a spreading function to the location of the selected epicenter, and the selected location is used as the location of the selected epicenter. For example, the spreading function includes random sampling from a circular area centered in the location of the selected epicenter, the circular area having an epicenter density corresponding to the epicenter density in the selected seismic zone.

In an embodiment, the seismic parameters are further indicative of a depth of earthquakes in each of the seismic zones. Furthermore, a selected depth of the selected epicenter is determined through random sampling from a distribution of the depth associated with the selected seismic zone, and the selected depth is included in the characteristics of an earthquake event.

In various embodiments, shown on a display are representations of earthquake events based on the signal, controlled is an earthquake simulator using the signal, and/or stored are stochastic earthquake event sets based on the signal. For example, based on the stochastic earthquake event sets, loss values are estimated and/or parameters of a financial investment structure are defined.

In addition to a computer system and a computer-implemented method for providing earthquake data for a defined area, the present invention also relates to a computer program product including computer program code means for controlling one or more processors of a computer, such that the computer stores locations of a plurality of earthquake epicenters; stores seismic parameters associated with a plurality of seismic zones, the seismic parameters being indicative at least of magnitude and likelihood of earthquakes in each of the seismic zones; determines from the locations a location of a selected epicenter within the area; determines from the seismic parameters a selected magnitude associated with a selected seismic zone comprising the selected epicenter; establishes characteristics of a plurality of earthquake events in the area over a defined length of time, the characteristics of an earthquake event including at least a selected epicenter and a selected magnitude; and generates a signal indicative of the characteristics of the earthquake events. Particularly, the computer program product includes a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
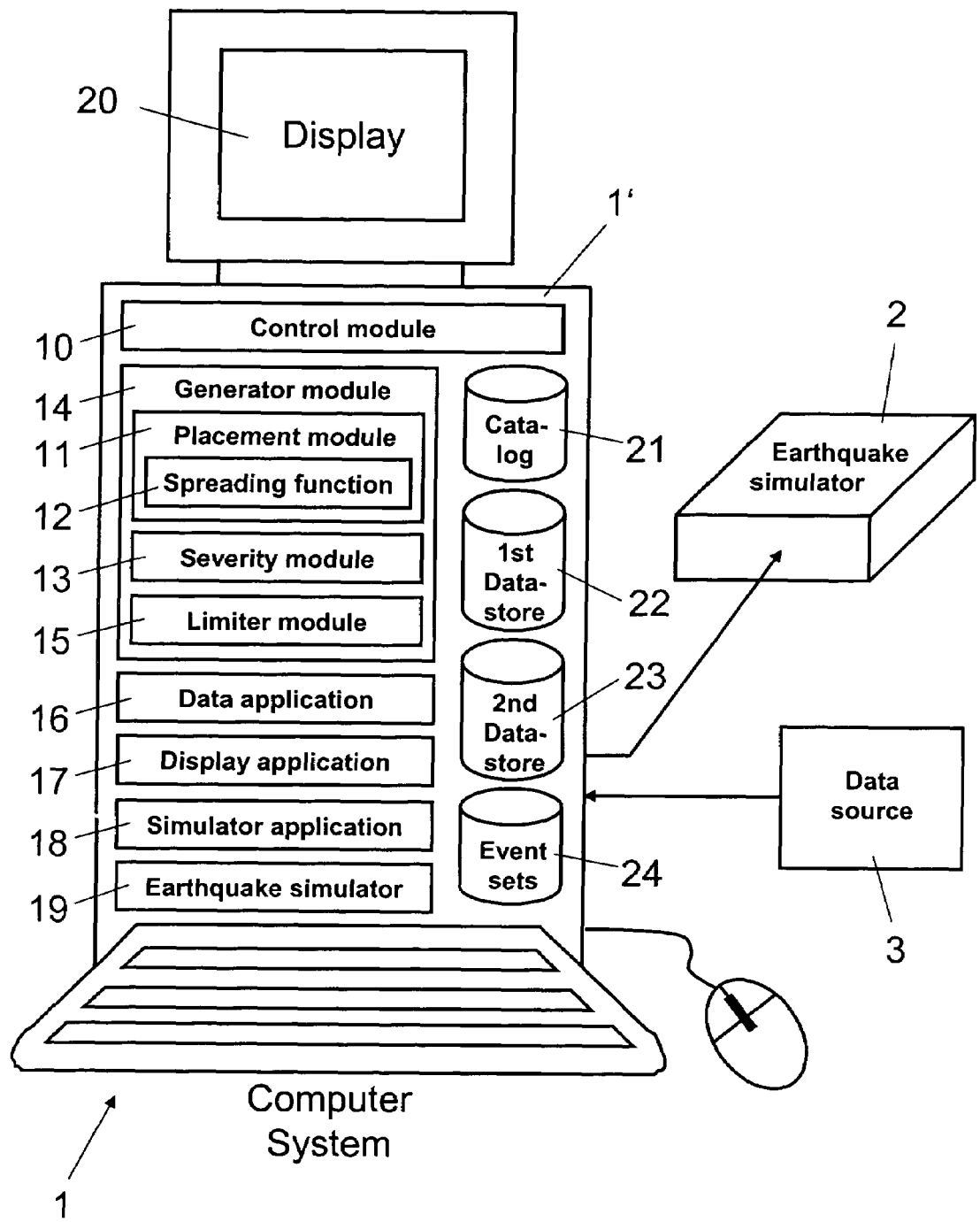
FIG. 1 shows a block diagram illustrating schematically an exemplary configuration of a computer system for practicing embodiments of the present invention, said configuration comprising a computer with a processor and memory.

In FIG. 1, reference numeral 1 refers to a computer system for providing earthquake data for a defined area. The computer system 1 includes one or more computers 1', for example personal computers, comprising one or more processors. Furthermore the computer system 1 includes a display 20 and data entry means such as a keyboard and a computer mouse. Optionally, the computer system 1 is connected via communication links to a peripheral earthquake simulator 2 and/or to one or more data sources 3. The earthquake simulator 2 comprises motion drivers configured to move mechanically parts of a model of a geographic area, for example. The data source 3 provides seismic parameters and includes, for example, one or more seismic measuring stations and/or data servers. As is illustrated schematically in FIG. 1, computer system 1 further includes various data stores, implemented as databases, data files and/or data tables: an earthquake catalog 21 for storing historical and instrumental earthquake data, a first data store 22 for storing locations of earthquake epicenters (epicenter seeds), a second data store 23 for storing seismic parameters associated with a plurality of seismic zones, and a further data store for storing earthquake event sets 24. One skilled in the art will understand that there are different possibilities for organizing and storing the data of these data stores.

As is illustrated in FIG. 1, the computer system further comprises various functional modules namely a control module 10, a placement module 11 with a spreading function 12, a severity module 13, a generator module 14, a limiter module 15, a data application module 16, a display application module 17, a simulator application module 18, and a computer-based earthquake simulator 19. Preferably, the functional modules are implemented as programmed software modules (e.g. in matlab code). The computer program code of the software modules is stored in a computer program product, i.e. in a computer readable medium, either in memory integrated in a computer 1' of computer system 1 or on a data carrier that can be inserted into a computer 1' of computer system 1. The software modules and the data stores can be installed on one common or on separate computers 1' of computer system 1. The computer program code of the software modules controls the computer(s) 1' of computer system 1 such that the computer system 1 executes various functions described later in more detail with reference to FIGS. 4, 5, 6, 7, and 8.

Figure 2:
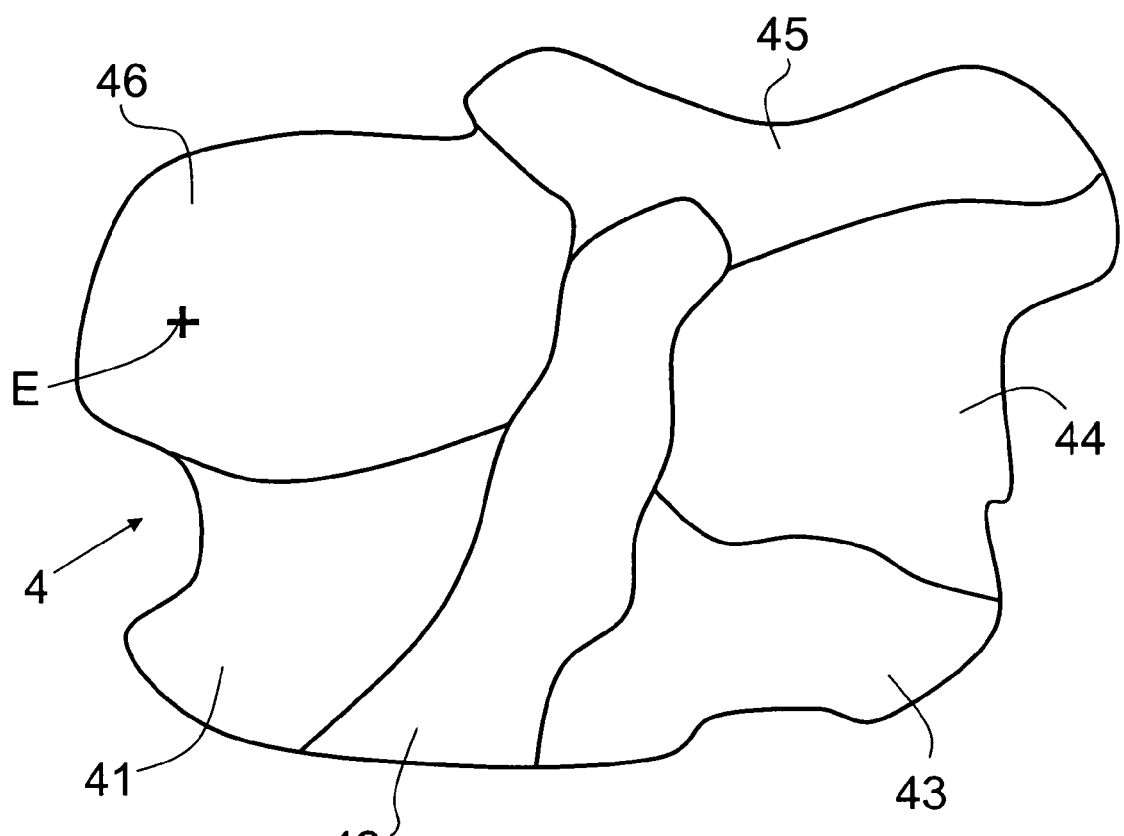
FIG. 2 shows a geographical area comprising multiple seismic zones.

FIG. 2 shows an example of a geographic area 4 (or region) comprising different seismic zones (or subregions) 41, 42, 43, 44, 45, and 46. A seismic zone 41, 42, 43, 44, 45, 46 defines a geographic area with a homogenous seismic behavior. Anywhere in a seismic zone 41, 42, 43, 44, 45, 46, the average period of time between the occurrences of earthquakes of a given magnitude is similar. The zones 41, 42, 43, 44, 45, 46 are defined based on information about active faults, observed seismicity from historical and instrumental seismic catalogs, as well as tectonic and geological data. Depending on the magnitude range, the different seismic zones 41, 42, 43, 44, 45, 46 are represented in the second data store 23 as characteristic seismic (source) zones or background seismic (source) zones, as will be explained later in more detail. Reference numeral E refers to the location of an earthquake epicenter in seismic zone 46.

The control module 10 is designed to control the individual functional modules as well as the user interface of computer system 1. The user interface is visualized on display 20 and receives data from the user through the data entry means of computer system 1.

Figure 4:
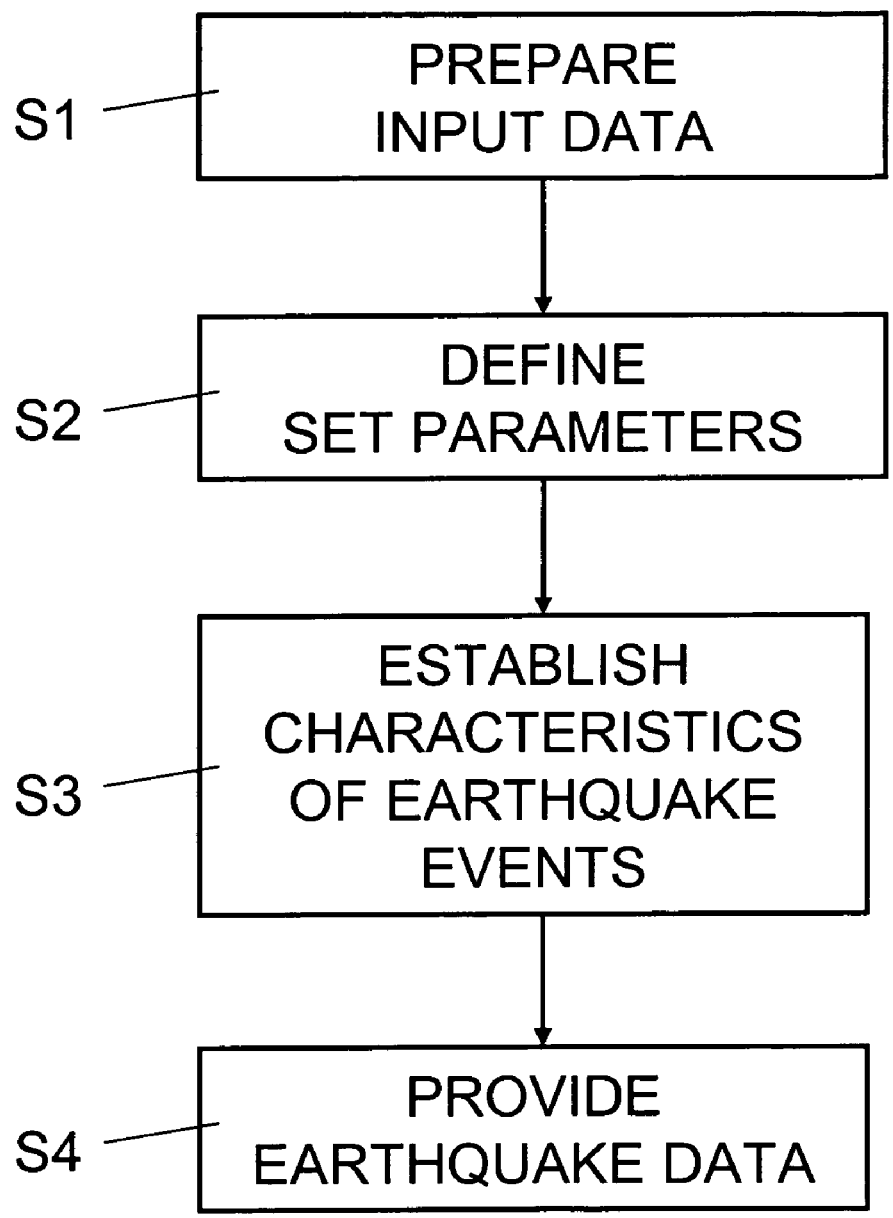
FIG. 4 shows a flow diagram illustrating an example of a sequence of steps executed according to the present invention for providing earthquake data for a defined area.

As illustrated in FIG. 4, in step S1, input data is prepared and stored for providing earthquake data.

In step S2, defined and stored are set parameters for an earthquake event set that is to be generated.

In step S3, the characteristics of a plurality of earthquake events are established based on the input data, prepared in step S1, for the earthquake event set, defined in step S2.

In step S4, earthquake data is provided based on the characteristics of earthquake events established in step S3.

Figure 5:
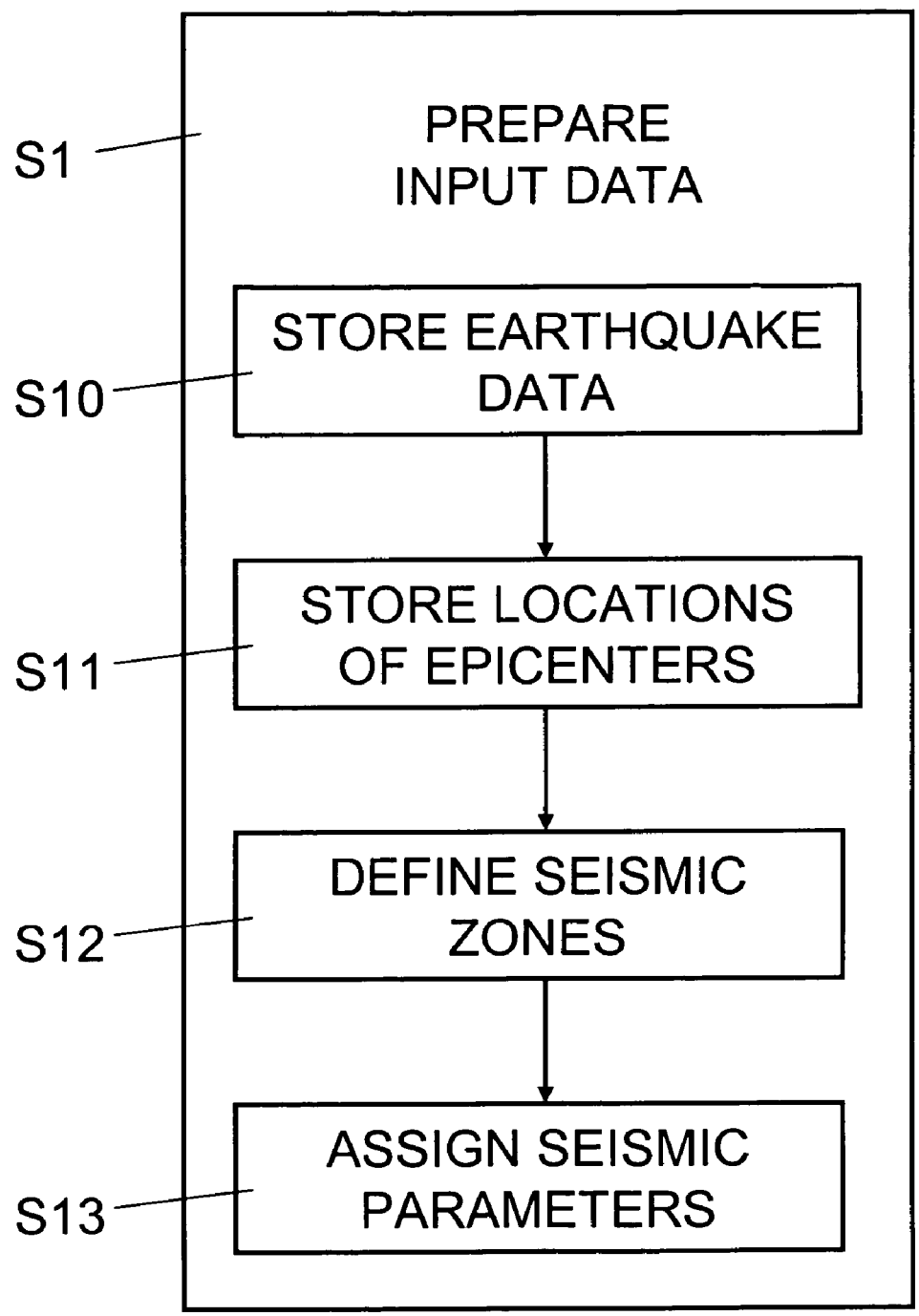
FIG. 5 shows a flow diagram illustrating an example of a sequence of steps executed according to the present invention for preparing input data.

As illustrated in FIG. 5, step S1 includes execution of steps S10, S11, S12, and S13. In preparatory step S10, the control module 10 stores historical and instrumental earthquake data in earthquake catalog 21. For each earthquake a magnitude and an epicenter location is stored in earthquake catalog 21. The historical and instrumental earthquake data is received from data source 3 and/or through manual data entry from the user. An earthquake catalog is complete over different time periods for different magnitude ranges. Completeness of the historical seismic catalog is determined by analyzing the rate of seismicity versus time within different magnitude intervals for the respective geographic area 4. As a complement to the epicenters in the historical catalog, optionally, so called 'extra-catalog' epicenters are added in areas with low historical seismicity, in order to assure that a minimum level of seismicity (and hazard) is assumed in the entire region.

In step S11, control module 10 stores the locations of the epicenters found in catalog 21 in the first data store 22. The control module 10 stores the locations of epicenters within a specific geographical area 4 or of all earthquakes stored in catalog 21. Preferably, only epicenters of earthquakes having a defined minimum magnitude exceeding a defined threshold magnitude, e.g. M>=3, are stored in the first data store 22.

In step S12, control module 10 stores definitions of the seismic zones in the second data store 23. For example, the seismic zones 41, 42, 43, 44, 45, 46 are defined by coordinates or zone identifiers (e.g. names) associated with coordinates. The seismic zones are defined for a specific geographical area 4 or for all the locations of the earthquake data stored in the first data store 22. Definitions of the seismic zones 41, 42, 43, 44, 45, 46 are received from data source 3 and/or through manual data entry from the user.

In step S13, control module 10 assigns to each seismic zone 41, 42, 43, 44, 45, 46 defined in the second data store 23 the seismic parameters associated with that zone. For the background seismic zones assigned are a "b" value, and a minimum and maximum magnitude that define the local Gutenberg-Richter distribution (magnitude-frequency distribution). For the characteristic seismic zones a return period and a characteristic magnitude are assigned. The user has also the option to assign a depth range. Attenuation parameters used to calculate the shaking intensity for each event are also assigned for each seismic zone 41, 42, 43, 44, 45, 46. The seismic parameters are received from data source 3 and/or through manual data entry from the user.

Figure 6:
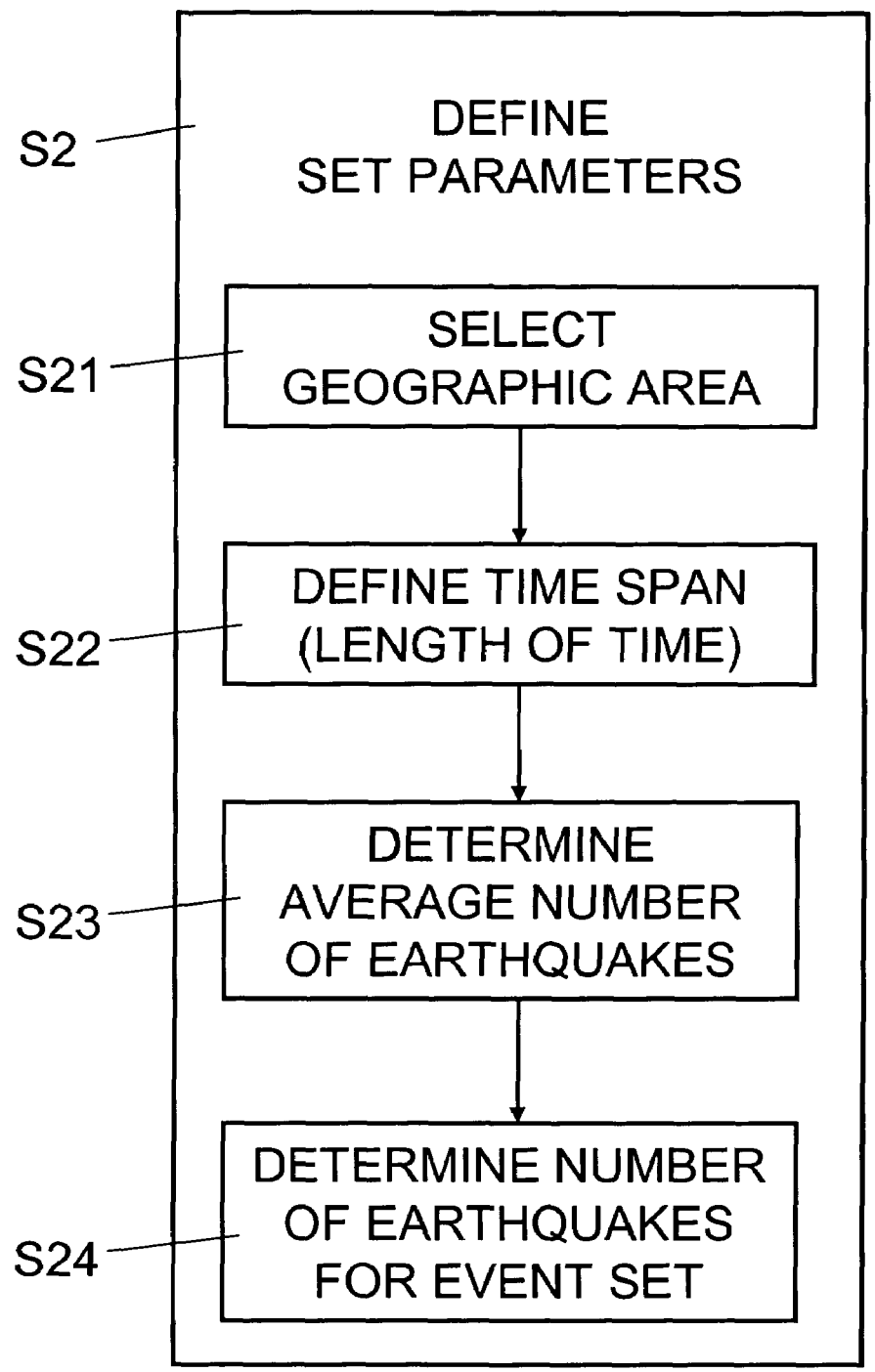
FIG. 6 shows a flow diagram illustrating an example of a sequence of steps executed according to the present invention for defining event set parameters.

As illustrated in FIG. 6, step S2 includes execution of steps S21, S22, S23, and S24. In step S21, the control module 10 stores the geographic area 4 for which an earthquake event set is to be determined. The selected geographic area 4 is received from the user through manual data entry. One skilled in that art will understand that the geographic area 4 may also be defined prior to steps S11, S12, and S13.

In step S22, the control module 10 stores the length of time T, e.g. a time span of a number of years, for which the earthquake event set is to be determined (i.e. the duration of a synthetic earthquake catalog, in which each event has an event frequency of f=1/T). The length of time T is received from the user through manual data entry.

In step S23, the generator module 14 determines from the earthquake catalog 21 the average number of earthquake events in a given recording period in the geographic area 4, specified in step S21.

In step S24, the generator module 14 determines the total number of different earthquake events to be determined for the event set based on the length of time, specified in step S22, and the average number of earthquake events in the area, as determined in step S23. For example, if the earthquake catalog covers a recording period of 200 years since catalog completeness and includes 80 earthquakes greater than the threshold magnitude, an average number of 80 earthquakes occur every 200 years. Thus, if the length of time is set to 150,000 years, 60,000 events need to be generated for the event set. The basic assumption is that earthquakes are temporally independent.

Figure 7:
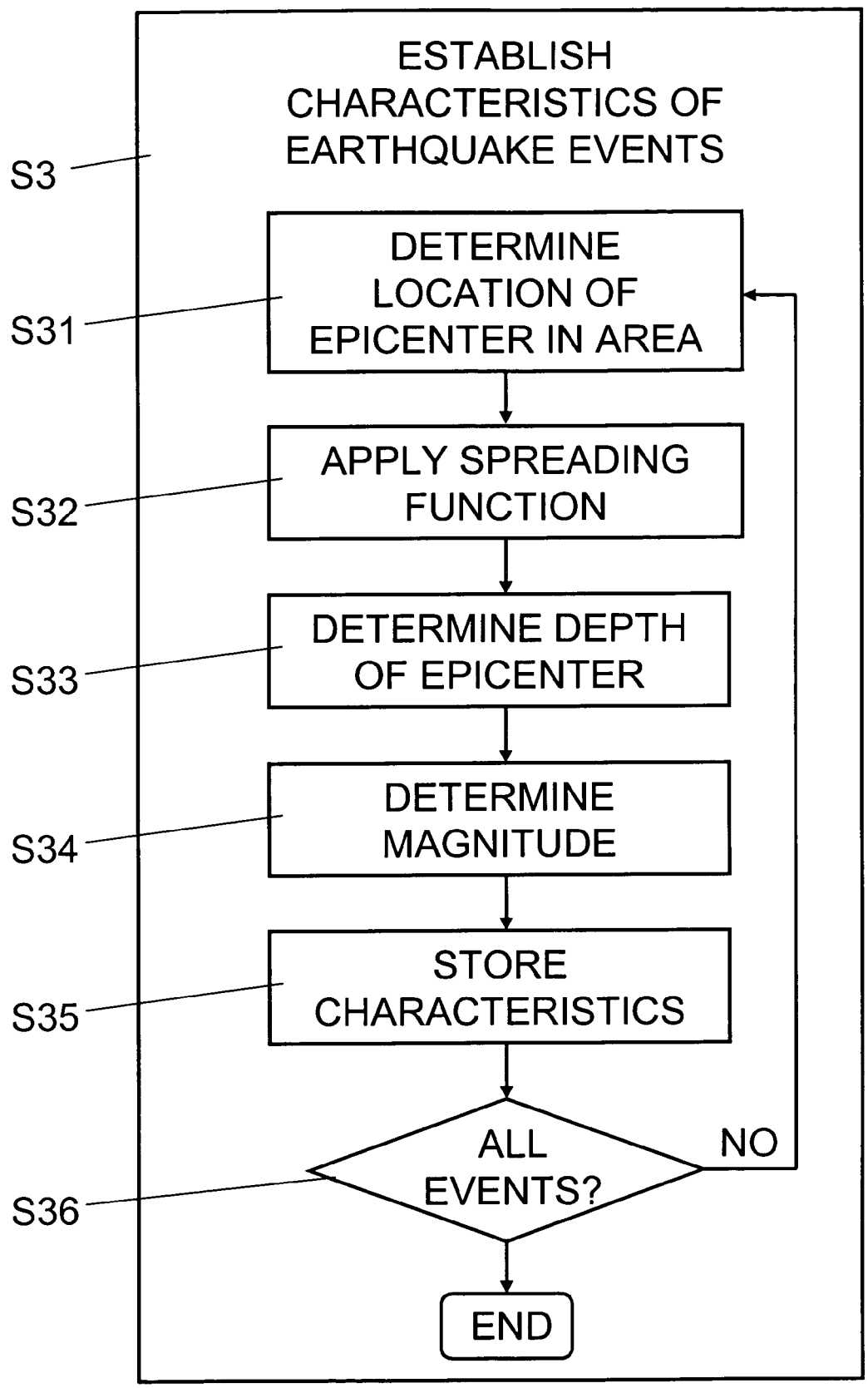
FIG. 7 shows a flow diagram illustrating an example of a sequence of steps executed according to the present invention for establishing characteristics of earthquake events.

As illustrated in FIG. 7, step S3 includes execution of steps S31, S32, S33, S34 and S35. In step S31, using bootstrap sampling, the placement module 11 determines from the first data store 22 the location of a selected epicenter E within the geographical area 4. One skilled in the art will understand, that the location of an epicenter, located within the geographical area 4 and having a defined minimum magnitude, for example, can also be determined directly from the earthquake catalog 21 using bootstrap sampling.

Preferably, the limiter module 15 limits the total number of simulated events for lower magnitude ranges (e.g. as part of step S24 or S34). This is achieved by splitting the overall magnitude range for the geographical area into two or more magnitude ranges. The magnitude threshold that controls the split is calculated as the quantile q of the magnitude cumulative distribution function corresponding to a given percentile value p, e.g. 95%. Generally, events corresponding to a percentile of 95% or less are small-moderate magnitude events. Over the lower range of magnitudes (below q), the number of simulated events is limited to $N_{max}$ and reducing the number of bootstrap sampling by a factor F. The factor F is calculated as $N_{max}$ divided by the number of events in the same magnitude range over the length of time T, specified in step S22. In order to preserve the total magnitude-frequency distribution, the corresponding event frequency is multiplied by the same factor F. For the magnitude range above q, there is no down sampling applied in order to preserve the stability of the simulation, as fewer events are generated for large magnitude.

Figure 3:
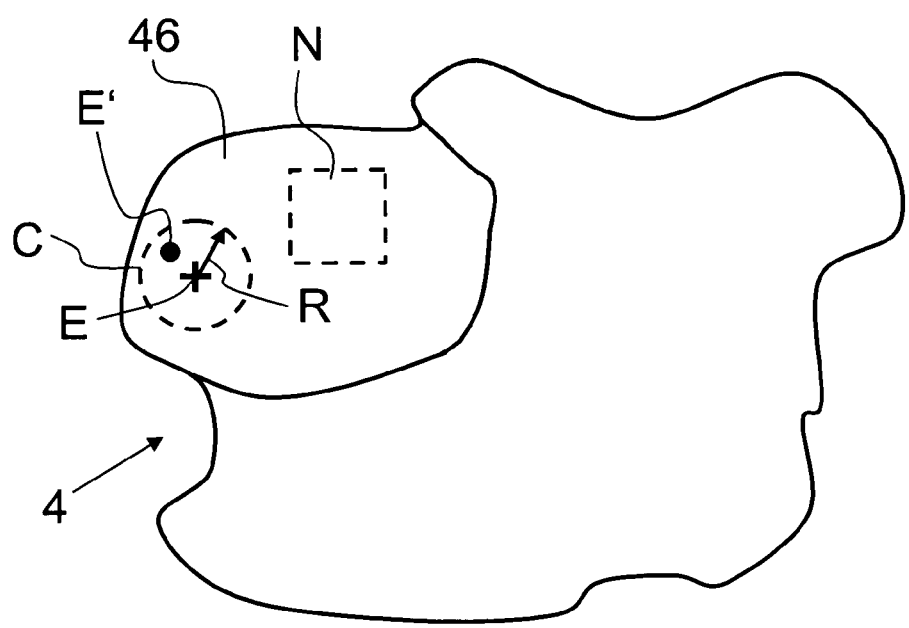
FIG. 3 shows a geographical area with a seismic zone where a spreading function is applied to the location of an epicenter.

In step S32, to account for randomness of earthquake locations, the placement module 11 applies an adaptive epicenter spreading function 12 to the epicenter location E selected in step S31. As is illustrated in the example of FIG. 3, the spreading function 12 selects a "reference" region representative of the average seismicity in the geographical area, for example in the seismic zone 46. For a target area N of a given size (e.g. 2500 km², equivalent to a 50×50 km² grid), the spreading function 12 determines an average epicenter density $N_{density}$. Moreover, the spreading function 12 calculates the radius R of a circular area C, centered at the epicenter location E, that contains the number $N_{density}$ of epicenters (earthquakes). Subsequently, the original coordinates of the epicenter selected in step S31 are spread by randomly sampling a radius from radius R and an azimuth. The basic assumption is that X (longitude) and Y (latitude) of the new "randomized" epicenter location E' are independent normal variables. In polar coordinates, the distance (radius) follows a Rayleigh distribution, while the azimuth follows a uniform distribution.

In step S33, the placement module 11 selects the depth of the selected epicenter through empirical or random sampling, e.g. through random sampling from a depth distribution associated with the selected seismic zone 46. For example, the depth distribution is provided in the earthquake catalog 21 or specified as uniform distribution by the user.

In step S34, the severity module 13 determines in the second data store 23 the seismic zone 46 that comprises the selected epicenter E (or E', respectively) and determines a magnitude associated with this seismic zone 46. The magnitude is determined by the severity module 13 through random sampling from a Gutenberg-Richter distribution, defined by seismic parameters associated with the seismic zone 46 and retrieved from the second data store 23. For example, the magnitude is determined using a stratified sampling technique or Latin Hypercube Sampling described in McKay, M. D., W. J. Conover and R. J. Beckman, "A Comparison of Three Methods for Selecting Values of Input Variables in the Analysis of Output from a Computer Code", Technometrics 21: 239-245, 1979. In essence, the severity module 13 combines a Gutenberg-Richter model and a characteristic earthquake model to select (simulate) event magnitudes.

For background seismic (source) zones (e.g. for magnitude ranges below 7), the Gutenberg-Richter distribution, as noted below in equation (1), represents mathematically the empirical correlation that the number of earthquakes decreases with increasing magnitude.

$$\log N(M) = a - bM \tag{1}$$

Where N is the cumulative number of earthquakes (per year) with magnitude greater or equal than M. N can be considered as the mean annual rate of exceedance, $\lambda_m$, of a given magnitude m. The "a" and "b" parameters in equation (1) are generally obtained by regression on a database of recorded earthquakes in the source zone of interest. $10^a$ is the mean yearly number of earthquakes of magnitude greater than or equal to zero. The "b" parameter describes the relative likelihood of large and small earthquakes. In a logarithmic plot the cumulative number of events is a linear function of magnitude with slope equal to the "b" parameter. It is to be noted, however, that in the present system 1 and method for providing earthquake data, the "a" value of the Gutenberg-Richter distribution does not need to be pre-computed, because the relative concentration of epicenters in different areas is reflected automatically in the stochastic event set.

For characteristic seismic (source) zones (e.g. for magnitude ranges above 7), a characteristic earthquake model assigns a specific return period to a specific magnitude, instead of deriving it from a Gutenberg-Richter distribution. The return period and characteristic magnitude are often derived from paleoseismology studies or from historical records that span a long time period. The frequency and magnitude assigned to characteristic events are subject to uncertainty, therefore a range of possible values are assigned to the characteristic frequency and/or magnitude. Usually, either a uniform or a Gaussian distribution is assumed to describe the characteristic magnitude. However, such an approach is not consistent with the observation that small events have more probability of occurrence than large events. Thus, in the present system 1 and method for providing earthquake data, the occurrence of characteristic earthquakes is modeled with an exponential distribution, such as the Gutenberg-Richter distribution, with a very low b-value in order to give enough weight to the large events. It is to be noted, that the term b-value in this context has nothing to do with historical seismicity. The characteristic return period is generated using a logNormal distribution with parameters taken from the literature and/or assigned by trial and error.

In step S35, the generator module 14 stores the characteristics of the earthquake event, the characteristics including the epicenter location E (or E', respectively) as determined in steps S31 and S32, the depth as determined in step S33, and the magnitude as determined in step S34.

In step S36, the generator module 14 checks whether or not the earthquake characteristics have been established for the total number of events, as determined in step S24 (and possibly adjusted by the limiter module 15). If further events need to be determined, the generator module 14 proceeds in step S31. Otherwise, if the full number of events has been determined, the generator module 14 proceeds in step S4.

Figure 8:
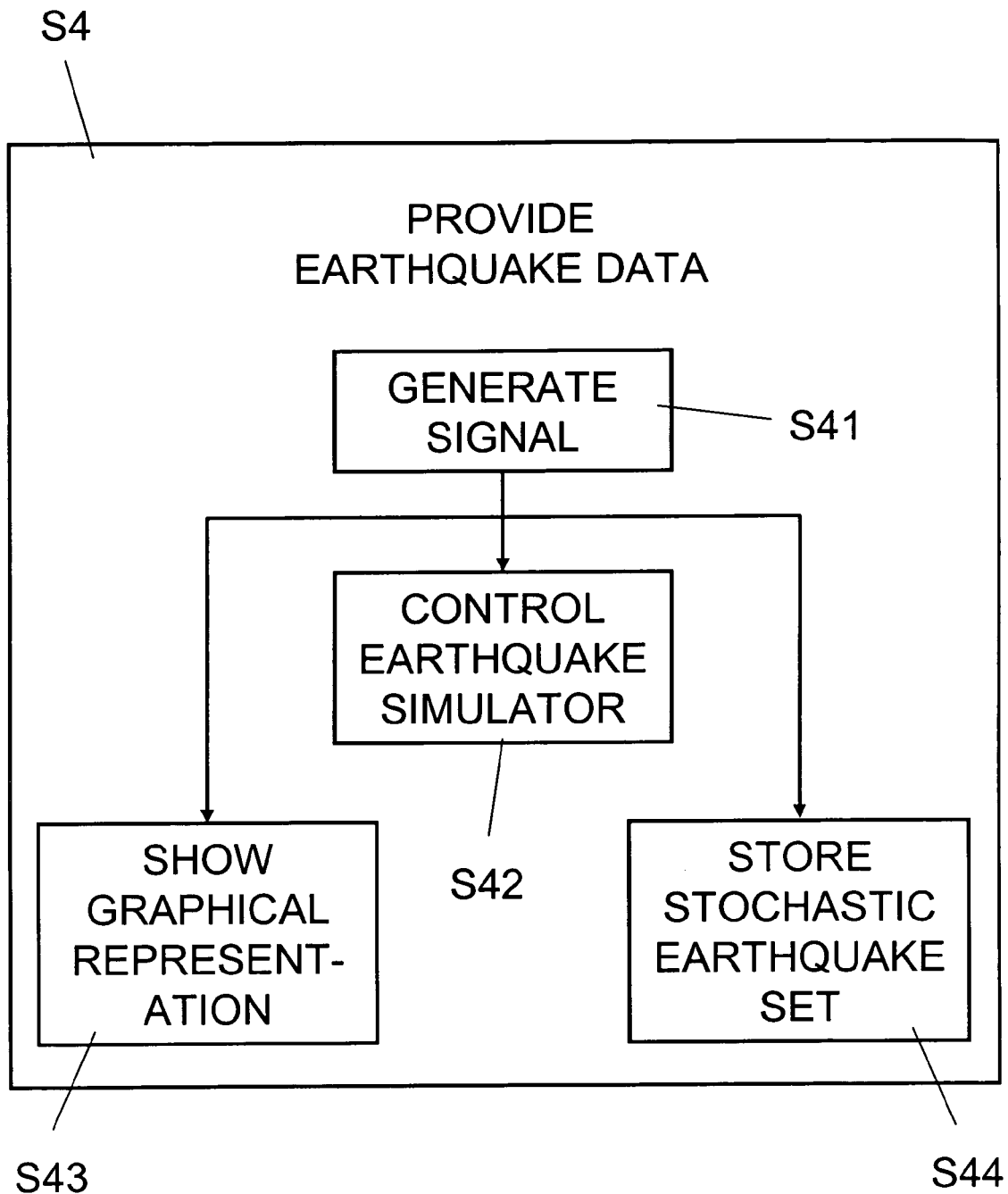
FIG. 8 shows a flow diagram illustrating an example of a sequence of steps executed according to the present invention for providing earthquake data.

As illustrated in FIG. 8, step S4 includes execution of step S41 as well as one or more of the steps S42, S43 and S44. In step S41, the generator module 14 generates a signal indicative of the characteristics of the earthquake events previously established. Depending on the application, the signal embodies a data set and/or a control signal, representing the established characteristics of the plurality of earthquake events included in the earthquake event set.

In step S42, the simulator application module 18 controls dynamically a hardware based earthquake simulator 2 or a computer based earthquake simulator 19 based on the signal generated in step S41. For example, the simulator application 18 generates one or more control signals based on the signal generated in step S41 and provides this control signal to the earthquake simulator 2 or 19. Responsive to the control signal, the earthquake simulator 2, 19 generates dynamic simulations of a series of earthquake events represented graphically on display 20 or mechanically by motion drivers of earthquake simulator 2, respectively.

In step S43, the display application module 17 shows on display 20 a graphical representation of earthquake events based on the signal generated in step S41.

In step S44, the data application module 16 stores a stochastic earthquake event set based on the signal generated in step S41. In an embodiment, the computer system 1 further comprises a loss estimation module configured to estimate loss values based on the stochastic earthquake event set. In another embodiment, the computer system 1 further comprises a financial structuring module configured to define parameters of a financial investment structure based on the stochastic earthquake event sets.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention. Moreover, in describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

What is claimed is:

1. A computer system for providing earthquake data for a defined area, the system comprising:
a first data store for storing locations of a plurality of historical earthquake epicenters;
a second data store for storing seismic parameters associated with a plurality of seismic zones, the seismic parameters being indicative at least of a magnitude and a likelihood of earthquakes in each of the seismic zones;
a placement module configured to determine from the first data store a location of a selected historical epicenter within the area;
a severity module configured to determine from the second data store a selected magnitude associated with a selected seismic zone comprising the selected historical epicenter; and
a generator module configured to establish characteristics of a plurality of earthquake events in the area over a defined length of time, the characteristics of an earthquake event including at least the selected historical epicenter and the selected magnitude, and to generate a signal indicative of the characteristics of the earthquake events, the signal configured to enable at least one of showing on a display representations of the earthquake events, controlling an earthquake simulator, and storing stochastic earthquake event sets.

2. The system of claim 1, wherein the generator module is further configured to determine a total number of different earthquake events to be determined based on the length of time to be covered by the earthquake data and on an average number of earthquake events in the area in a recording period.

3. The system of claim 1, further comprising:
a limiter module configured to split the magnitude of earthquakes in the area into at least two ranges of higher and lower magnitudes, and to limit for ranges with lower magnitudes a number of earthquake events to be determined while adjusting correspondingly a frequency of these latter earthquake events.

4. The system of claim 1, wherein the placement module is configured to determine the location of the selected epicenter from the first data store using bootstrap sampling.

5. The system of claim 1, wherein the seismic parameters define a Gutenberg-Richter distribution, and wherein the severity module is configured to determine the selected magnitude through random sampling from the Gutenberg-Richter distribution defined by the seismic parameters associated with selected seismic zone.

6. The system of claim 5, wherein the severity module is configured to determine the selected magnitude using stratified sampling.

7. The system of claim 1, wherein the placement module is configured to determine a selected location by applying a spreading function to the location of the selected epicenter, and to use the selected location as the location of the selected epicenter.

8. The system of claim 7, wherein applying the spreading function includes random sampling from a circular area centered in the location of the selected epicenter, the circular area having an epicenter density corresponding to the epicenter density in the selected seismic zone.

9. The system of claim 1, wherein
the seismic parameters are further indicative of a depth of earthquakes in each of the seismic zones,
the placement module is configured to determine a selected depth of the selected epicenter through random sampling from a distribution of the depth associated with the selected seismic zone, and the generator module is further configured to include the selected depth in the characteristics of an earthquake event.

10. The system of claim 1, wherein the second data store is configured to store as seismic parameters cumulative numbers of earthquakes of given magnitudes per year in the seismic zones.

11. The system of claim 1, wherein the second data store is configured to store as seismic parameters return periods of earthquakes of specific magnitudes in the seismic zones.

12. The system of claim 1, further comprising:
a display application module configured to show on a display representations of earthquake events based on the signal.

13. The system of claim 1, further comprising:
a simulator application module configured to control an earthquake simulator using the signal.

14. The system of claim 1, further comprising:
a data application module configured to store stochastic earthquake event sets based on the signal.

15. The system of claim 14, further comprising:
a loss estimation module configured to estimate loss values based on the stochastic earthquake event sets.

16. The system of claim 14, further comprising:
a financial structuring module configured to define parameters of a financial investment structure based on the stochastic earthquake event sets.

17. The computer system according to claim 1, further comprising:
the earthquake simulator, wherein
said signal configured to enable at least one of showing on the display representations of the earthquake events, controlling the earthquake simulator, and storing the stochastic earthquake event sets is configured to enable controlling a physical movement of the earthquake simulator.

18. A computer-implemented method for providing earthquake data for a defined area, the method comprising:
storing locations of a plurality of historical earthquake epicenters;
storing seismic parameters associated with a plurality of seismic zones, the seismic parameters being indicative at least of a magnitude and a likelihood of earthquakes in each of the seismic zones;
determining from the locations a location of a selected epicenter within the area;
determining from the seismic parameters a selected magnitude associated with a selected seismic zone comprising the selected epicenter;
establishing characteristics of a plurality of earthquake events in the area over a defined length of time, the characteristics of an earthquake event including at least a selected epicenter and a selected magnitude; and
generating a signal indicative of the characteristics of the earthquake events, the signal configured to enable at least one of showing on a display representations of the earthquake events, controlling an earthquake simulator, and storing stochastic earthquake event sets.

19. The method of claim 18, further comprising:
determining a total number of different earthquake events to be determined based on the length of time to be covered by the earthquake data and on an average number of earthquake events in the area in a recording period.

20. The method of claim 18, further comprising:
splitting the magnitude of earthquakes in the area into at least two ranges of higher and lower magnitudes; and limiting for ranges with lower magnitudes a number of earthquake events to be determined while adjusting correspondingly a frequency of these latter earthquake events.

21. The method of claim 18, wherein the location of the selected epicenter is determined using bootstrap sampling.

22. The method of claim 18, wherein the seismic parameters define a Gutenberg-Richter distribution, and the selected magnitude is determined through random sampling from the Gutenberg-Richter distribution defined by the seismic parameters associated with selected seismic zone.

23. The method of claim 22, wherein the selected magnitude is determined using stratified sampling.

24. The method of claim 18, further comprising:

determining a selected location by applying a spreading function to the location of the selected epicenter, and using the selected location as the location of the selected epicenter.

25. The method of claim 24, wherein applying the spreading function includes random sampling from a circular area centered in the location of the selected epicenter, the circular area having an epicenter density corresponding to the epicenter density in the selected seismic zone.

26. The method of claim 18, further comprising:

determining a selected depth of the selected epicenter through random sampling from a distribution of the depth associated with the selected seismic zone; and including the selected depth in the characteristics of an earthquake event, wherein the seismic parameters are further indicative of a depth of earthquakes in each of the seismic zones.

27. The method of claim 18, further comprising:

storing as seismic parameters cumulative numbers of earthquakes of given magnitudes per year in the seismic zones.

28. The method of claim 18, further comprising:

storing as seismic parameters return periods of earthquakes of specific magnitudes in the seismic zones.

29. The method of claim 18, further comprising:

showing on a display representations of earthquake events based on the signal.

30. The method of claim 18, further comprising:

controlling an earthquake simulator using the signal.

31. The method of claim 18, further comprising:

storing stochastic earthquake event sets based on the signal.

32. The method of claim 31, further comprising:

estimating loss values based on the stochastic earthquake event sets.

33. The method of claim 31, further comprising:

defining parameters of a financial investment structure based on the stochastic earthquake event sets.

34. A computer readable medium including computer executable instructions for controlling one or more processors of a computer system for providing earthquake data for a defined area, such that the computer system performs the method of:

storing locations of a plurality of historical earthquake epicenters;

storing seismic parameters associated with a plurality of seismic zones, the seismic parameters being indicative at least of a magnitude and a likelihood of earthquakes in each of the seismic zones;

determining from the locations a location of a selected epicenter within the area;

determining from the seismic parameters a selected magnitude associated with a selected seismic zone comprising the selected epicenter;

establishing characteristics of a plurality of earthquake events in the area over a defined length of time, the characteristics of an earthquake event including at least a selected epicenter and a selected magnitude; and generating a signal indicative of the characteristics of the earthquake events, the signal configured to enable at least one of showing on a display representations of the earthquake events, controlling an earthquake simulator, and storing stochastic earthquake event sets.

* * * * *